United States Patent
Jian

(10) Patent No.: US 11,657,572 B2
(45) Date of Patent: May 23, 2023

(54) SYSTEMS AND METHODS FOR MAP GENERATION BASED ON RAY-CASTING AND SEMANTIC CLASS IMAGES

(71) Applicant: Argo AI, LLC, Pittsburgh, PA (US)

(72) Inventor: Yong-Dian Jian, Campbell, CA (US)

(73) Assignee: argo ai, llc, Pittsburgh, PA (US)

( * ) Notice: Subject to any disclaimer, the term of this patent is extended or adjusted under 35 U.S.C. 154(b) by 72 days.

(21) Appl. No.: 17/075,827

(22) Filed: Oct. 21, 2020

(65) Prior Publication Data

US 2022/0122324 A1    Apr. 21, 2022

(51) Int. Cl.
G06T 17/20    (2006.01)
G06T 15/08    (2011.01)
G06T 15/06    (2011.01)

(52) U.S. Cl.
CPC ............ *G06T 17/205* (2013.01); *G06T 15/06* (2013.01); *G06T 15/08* (2013.01)

(58) Field of Classification Search
CPC ........ G06T 17/205; G06T 15/06; G06T 15/08
See application file for complete search history.

(56) References Cited

U.S. PATENT DOCUMENTS

| | | | |
|---|---|---|---|
| 10,535,148 B2* | 1/2020 | Metzler | H04N 5/23238 |
| 10,839,530 B1* | 11/2020 | Berger | G06T 15/08 |
| 2014/0037189 A1* | 2/2014 | Ziegler | G06F 9/4401 |
| | | | 382/154 |
| 2016/0154999 A1* | 6/2016 | Fan | G06V 20/64 |
| | | | 382/103 |
| 2019/0147245 A1* | 5/2019 | Qi | G06V 20/10 |
| | | | 382/103 |
| 2019/0258737 A1 | 8/2019 | Wang et al. | |
| 2019/0266418 A1* | 8/2019 | Xu | G06V 10/457 |
| 2019/0271554 A1 | 9/2019 | Colgate et al. | |
| 2019/0286915 A1 | 9/2019 | Patil | |

(Continued)

FOREIGN PATENT DOCUMENTS

WO    2020035661 A1    2/2020

OTHER PUBLICATIONS

Litomisky, Removing Moving Objects from Point Cloud Scenes, DOI:10.1007/978-3-642-40303-3_6, WDIA 2012: Advances in Depth Image Analysis and Applications pp. 50-58 (Year: 2012).*

(Continued)

*Primary Examiner* — Phuc N Doan
(74) *Attorney, Agent, or Firm* — Fox Rothschild, LLP

(57) ABSTRACT

Systems and methods for generating a map. The methods comprise: performing, by a computing device, ray-casting operations to generate a 3D point cloud with a reduced number of data points associated with moving objects; generating, by the computing device, a 2D binary mask for at least one semantic label class of the 3D point cloud; determining, by the computing device, x-coordinates and y-coordinates for a 2D volume defining an object of the at least one semantic label class; identifying, by the computing device, data points in the 3D point cloud based on the 2D volume; comparing, by the computing device, z-coordinates of the identified data points to at least one threshold value selected for the at least one semantic label class; and generating, by the computing device, the map by removing data points from the 3D point cloud based on results of the comparing.

21 Claims, 11 Drawing Sheets

(56) References Cited

U.S. PATENT DOCUMENTS

| | | | | |
|---|---|---|---|---|
| 2019/0355173 A1* | 11/2019 | Gao | ......................... | G06T 17/05 |
| 2020/0025931 A1* | 1/2020 | Liang | ..................... | G06K 9/627 |
| 2020/0025935 A1* | 1/2020 | Liang | ..................... | G06N 3/08 |
| 2020/0364554 A1* | 11/2020 | Wang | ........................ | G06T 7/20 |
| 2021/0056716 A1* | 2/2021 | Mörwald | .............. | G06T 3/4053 |
| 2021/0183139 A1 | 6/2021 | Richert et al. | | |
| 2021/0279950 A1* | 9/2021 | Phalak | ................... | G06V 20/64 |

OTHER PUBLICATIONS

Schauer, The peopleremover—removing dynamic objects from 3D point cloud data by traversing a voxel occupancy grid, IEEE Robotics and Automation Letters. Preprint Version. Accepted Jan. 2018 (Year: 2018).*

"What is SLAM? (Simultaneous Localization and Mapping)", available at https://www.mathworks.com/discovery/slam.html printed on Sep. 17, 2020.

Schauer, J. et al., "Removing Non-Static Objects From 3D Laser Scan Data", ISPRS Journal of Phtogrammetry and Remote Sensing (2018), available at https://doi.org/10.1016/j.isprsjprs.2018.05.019.

Stucker, C., "Semantic Piont Cloud Filtering", (2017) Master Thesis, Institute of Geodesy and Photogrammetry, Swiss Federal Institute of Technology, Zurich.

* cited by examiner

SYSTEMS AND METHODS FOR MAP GENERATION BASED ON RAY-CASTING AND SEMANTIC CLASS IMAGES

BACKGROUND

Statement of the Technical Field

The present disclosure relates generally to map generation systems. More particularly, the present disclosure relates to implementing systems and methods for map generation based on ray-casting and semantic class images.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for identifying objects, tracking movements of the object, making predictions as to the objects trajectory, and planning paths of travel for the vehicle based on the predicted objects trajectory.

SUMMARY

The present disclosure concerns implementing systems and methods for generating a map. The methods comprise: performing, by a computing device, ray-casting operations to generate a 3D point cloud with a reduced number of data points associated with moving objects; generating, by the computing device, a 2D binary mask for at least one semantic label class of the 3D point cloud; determining, by the computing device, x-coordinates and y-coordinates for a 2D volume defining an object of the at least one semantic label class (e.g., road or sidewalk); identifying, by the computing device, data points in the 3D point cloud based on the 2D volume; comparing, by the computing device, z-coordinates of the identified data points to at least one threshold value selected for the at least one semantic label class; and generating, by the computing device, the map by removing data points from the 3D point cloud based on results of the comparing. The map may be used to control operations of a vehicle.

In some scenarios, the 2D binary mask is generated by projecting data points of the 3D point cloud to a 2D plane. The data points associated with the at least one semantic label class are provided in a first format within the 2D binary mask, and data points associated with other semantic label classes are provided in a second format within the 2D binary mask. The first format may comprise a first color (e.g., white), and the second format may comprise a second different color (e.g., black).

In those or other scenarios, the identified data points comprise data points in the 3D point cloud that (i) are associated with the at least one semantic label class and (ii) have x and y coordinates that are contained in the 2D volume. The z-coordinates of the identified data points may be compared to a minimum threshold value for the at least one semantic label class, and to a maximum threshold value for the at least one semantic label class. As such, the data points which are removed from the 3D point cloud may comprise have z-coordinates falling within a range defined by the minimum threshold value and the maximum threshold value. At least two semantic label classes may have a different threshold value associated therewith.

BRIEF DESCRIPTION OF THE DRAWINGS

The present solution will be described with reference to the following drawing figures, in which like numerals represent like items throughout the figures.

DETAILED DESCRIPTION

Figure 1:
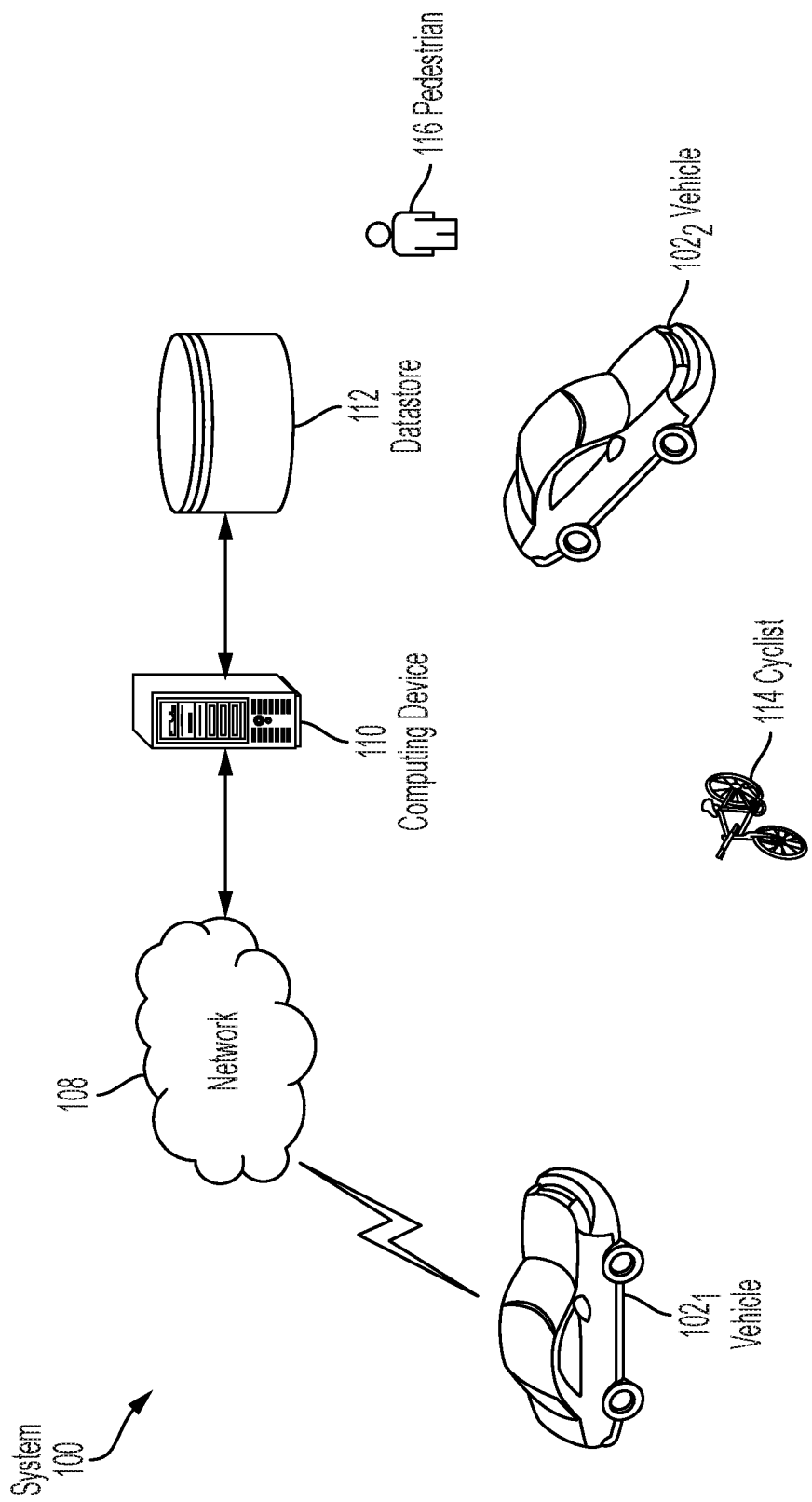
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present solution is described herein in the context of an Autonomous Vehicle (AV). The present solution is not limited to AV applications. The present solution can be used in other applications where high definition road/terrain maps are needed to control operations of a device (e.g., a robot).

Building high definition road/terrain maps for autonomous driving requires using a 3D laser scanner (e.g., a LiDAR system) to scan an environment and align 3D point clouds to a common coordinate system (e.g., an xyz coordinate system). The aligned 3D point clouds contain both the data points from static background objects and data points from moving objects surrounding the AV. To make high quality road/terrain maps, data points on the moving objects need to be identified within and removed from the 3D point cloud(s). In the present document, a novel technique is proposed to solve the aforementioned problem.

The present solution provides implementing systems and methods for map generation. The input into the system is an aligned 3D point cloud. An originating sensor pose and a semantical label class are known for each data point in the 3D point cloud. The semantic label class can include, but is not limited to, road, sidewalk, pedestrian, and/or vehicle. Data point alignment may be achieved using any known technique such as Simultaneous Localization and Mapping (SLAM). The per-point semantic label classes can be obtained by using a machine learning technique as known in the art.

The methods generally involve generating high-definition maps using 3D laser scan data with dynamic points/objects removed from registered point clouds using ray-casting and semantic class images. The methods generally involve: obtaining 3D range data generated by a 3D laser scanner (e.g., a LiDAR system) from multiple vantage points or locations; aligning 3D point clouds using, for example, SLAM; and combining the aligned 3D point clouds to form a combined 3D point cloud. Next, ray tracing operations are performed to test whether any object of the 3D range data was at any time see-through. Data points are removed from the combined 3D point cloud that are associated with the see-through object(s) to generate a pruned 3D point cloud.

The pruned 3D point cloud still comprises data points associated with moving objects due to errors of SLAM results, errors in vehicle poses, errors in sensor calibration, and/or errors in time synchronization. Plus, the error of ray-casting is naturally proportional to the distance between the 3D laser scanner and the surface being detected. Also, ray-casting is unable to detect and remove data points associated with temporarily stationary movable objects (e.g., cars parked off the streets). Thus, the present solution involves additional semantic label based operations to remove any remaining data points from the pruned 3D point cloud that are associated with moving objects.

The semantic label based operations are performed to generally (i) create a semantic surface image and (ii) remove data points above surfaces of the roads and sidewalks. The first task (i) can be achieved by projecting 3D data points to a 2D plane to create per-class binary images. For each semantic label class, class-dependent heuristics is used to remove data points above the roads and sidewalks, while still preserving data points associated with stationary structures (e.g., building, signs, light poles, etc.) in the map.

Accordingly, semantic labels for data points in the pruned 3D point cloud are obtained. Next, operations are performed using the pruned 3D point cloud to test whether any remaining data points associated with given semantic label classes (e.g., road and/or sidewall) have height coordinates which do not fall within respective threshold ranges. The semantic label based operations involve: (a) obtaining a pre-defined tile size (e.g., 30 meter by 30 meter); (b) selecting a portion of the pruned 3D point cloud having the pre-defined tile size; (c) processing the data points in the selected portion of the pruned 3D point cloud to generate a 2D binary mask for each semantic label class (e.g., road, sidewalk, etc.) by projecting 3D data points to a 2D plane (with data points of the semantic label class shown in a first color (e.g., white) and data points of all other semantic label classes shown in a second different color (e.g., black)); (d) selecting one of the 2D binary masks; processing the selected 2D binary mask to determine x-coordinates and y-coordinates for a 2D volume that defines the object of the given semantic label class (e.g., a road or a sidewalk); (e) identifying data points in the pruned 3D point cloud that (i) are of the same semantic label class (e.g., road or sidewalk) as the 2D binary mask and (ii) have x-coordinates/y-coordinates contained in the 2D volume; (f) comparing the z-coordinates of the identified data points to a minimum threshold value and a maximum threshold value (the threshold values being pre-defined for the respective semantic label class (e.g., road or sidewalk)); (g) marking data points for removal which have z-coordinates that are less than the minimum threshold value and greater than the maximum threshold value; (h) repeating operations (d)-(g) for a next 2D binary mask; and repeating (c)-(h) for a next portion of the pruned 3D point cloud having the pre-defined tile size. A final 3D point cloud is generated by removing the data points from the pruned 3D point cloud that are marked for removal.

The final 3D point cloud can be used in various applications. These applications include, but are not limited to, AV applications, semi-autonomous vehicle applications, and/or robotic applications. The present solution will be described below in relation to AVs. The present solution is not limited in this regard.

Illustrative Implementing Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. The object detection is achieved in accordance with any known or to be known object detection process. The object detection process can be performed at the AV $102_1$, at the remote computing device 110, or partially at both the AV $102_1$ and the remote computing device 110. Accordingly, information related to object detection may be communicated between the AV and a remote computing device 110 via a network 108 (e.g., the Internet, a cellular network and/or a radio network). The object detection related information may also be stored in a database 112.

When such an object detection is made, AV $102_1$ performs operations to: generate one or more possible object trajectories for the detected object; and analyze at least one of the generated possible object trajectories to determine whether or not there is an undesirable level of risk that a collision will occur between the AV and object if the AV is to follow a given trajectory. The given vehicle trajectory is generated by the AV $102_1$ using a high-definition map produced in accordance with the present solution. The high-definition map is produced using 3D laser scan data with dynamic points/objects removed from registered point clouds via ray-casting and semantic class images. The manner in which the high-definition map is produced will become more evident as the discussion progresses.

If there is not an undesirable level of risk that a collision will occur between the AV and object if the AV is to follow a given trajectory, then the AV $102_1$ is caused to follow the given vehicle trajectory. If is an undesirable level of risk that a collision will occur between the AV and object if the AV is to follow a given trajectory, then the AV $102_1$ is caused to (i) follow another vehicle trajectory with a relatively low risk of collision with the object or (ii) perform a maneuver to reduce the risk of collision with the object or avoid collision with the object (e.g., brakes and/or changes direction of travel).

Figure 2:
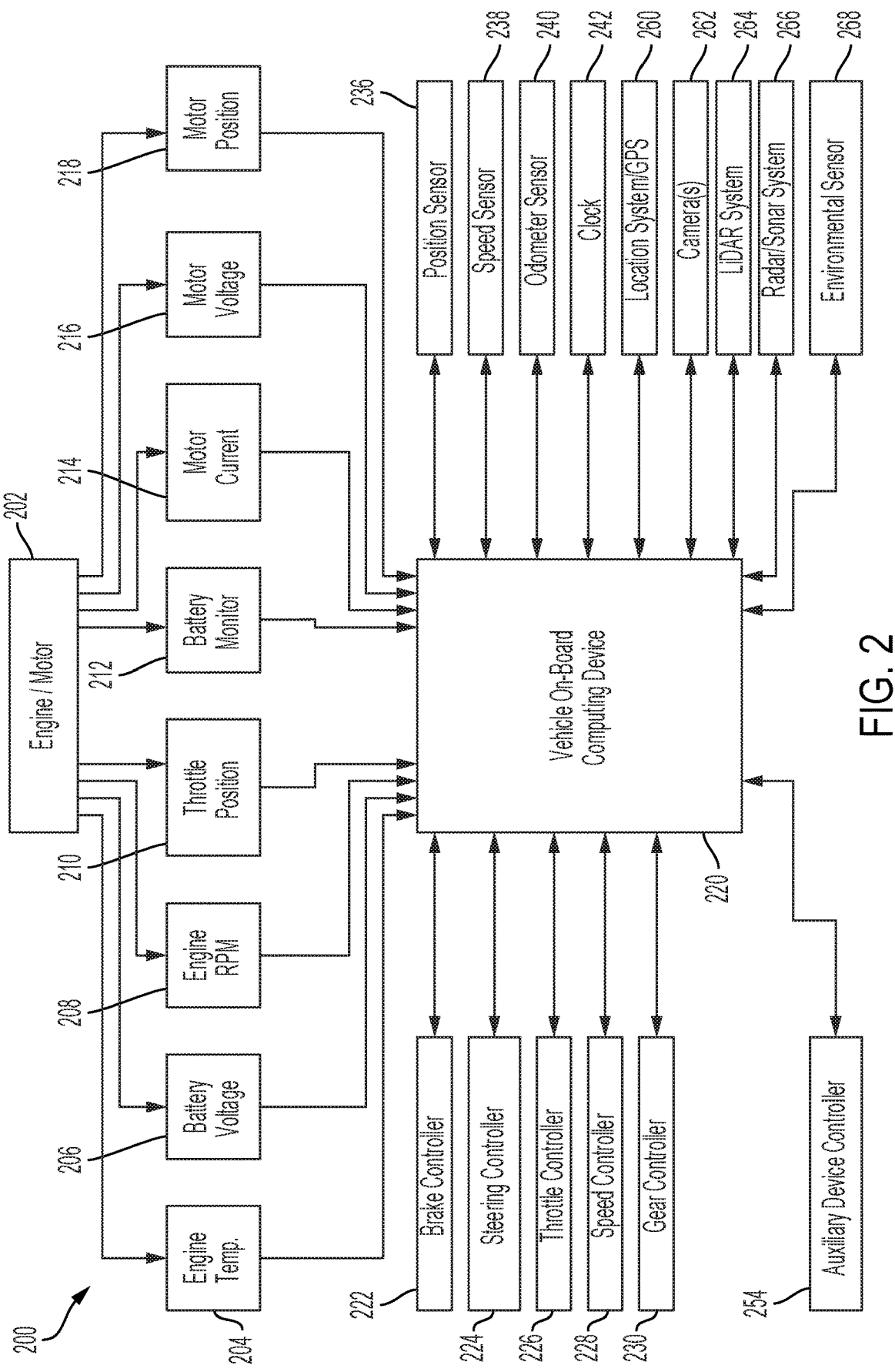
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example, a position sensor 236 such as an accelerometer, gyroscope and/or inertial measurement unit, a speed sensor 238, and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example, a location sensor 260 (e.g., a Global Positioning System (GPS) device), object detection sensors (e.g., camera(s) 262), a LiDAR system 264, and/or a radar/sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors (e.g., LiDAR system 264) is communicated to the on-board computing device 220. The object detection information and/or captured images are processed by the on-board computing device 220 to detect objects in proximity to the vehicle 200. The object detections are made in accordance with any known or to be known object detection technique.

When the on-board computing device 220 detects a moving object, the on-board computing device 220 will generate one or more possible object trajectories for the detected object, and analyze the possible object trajectories to assess the risk of a collision between the object and the AV if the AV was to follow a given vehicle trajectory. If there is not a risk of collision, then the AV is caused to follow the given vehicle trajectory. If there is a risk of collision, then an alternative vehicle trajectory can be generated and/or the AV can be caused to perform a certain maneuver (e.g., brake, accelerate and/or change direction of travel). The vehicle trajectories are generated using a high definition map which is created in accordance with the present solution. The manner in which the high definition map is created will become evident as the discussion progresses.

Figure 3:
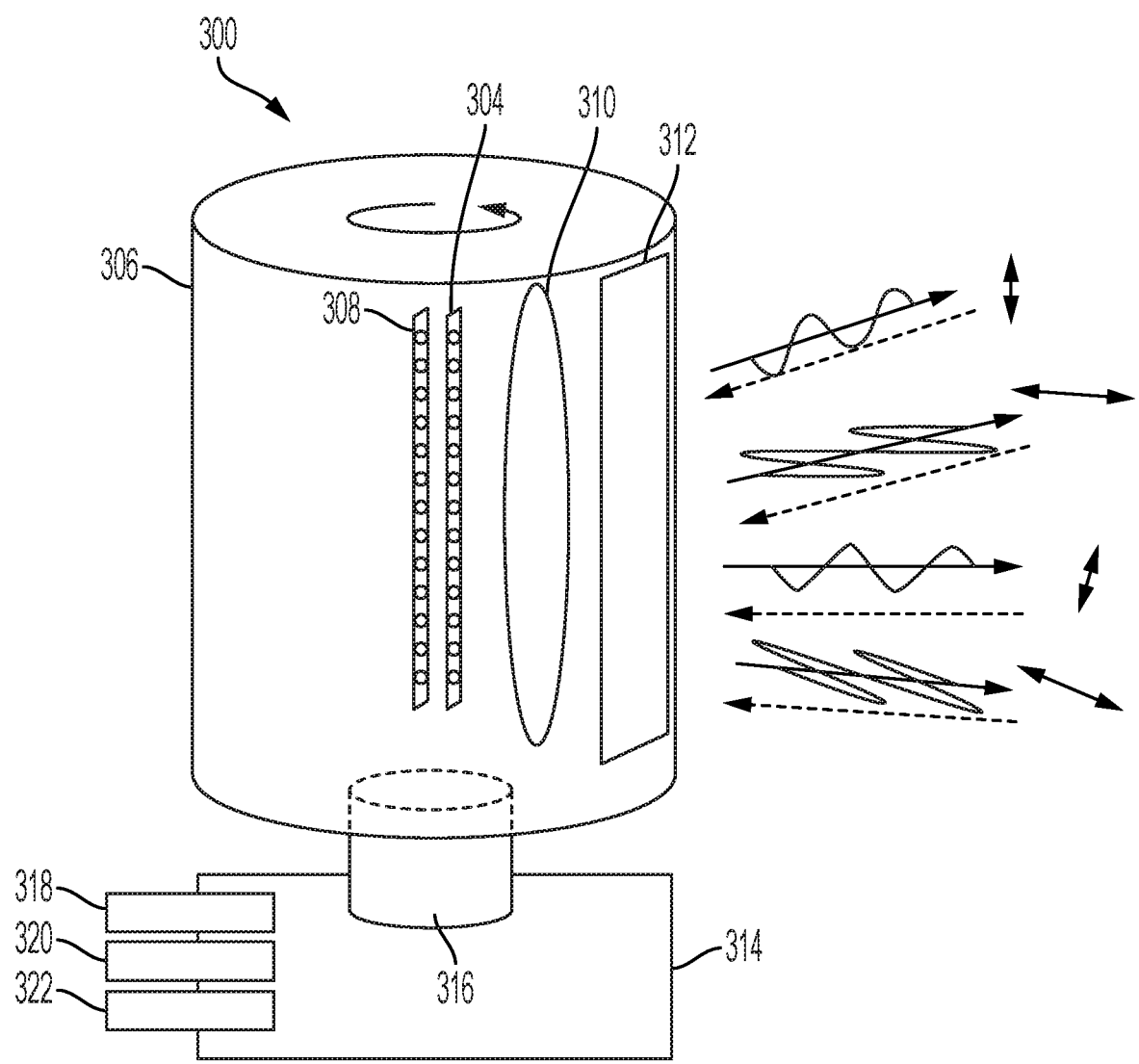
FIG. 3 is an illustration of an illustrative architecture for a LiDAR system employed by the vehicle shown in FIG. 2.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or waveplates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
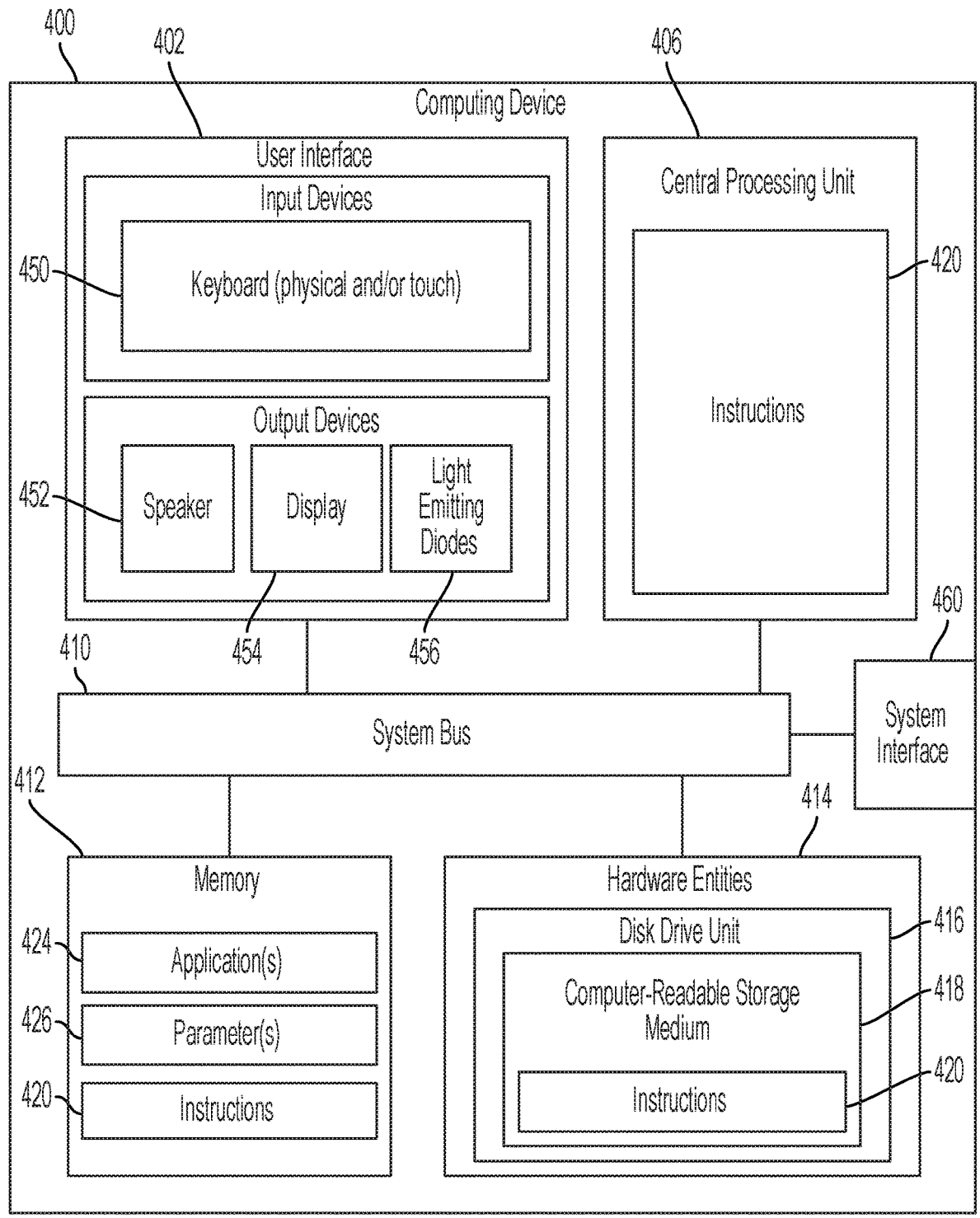
FIG. 4 is an illustration of an illustrative architecture for a computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 400. As such, the discussion of computing device 400 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5A:
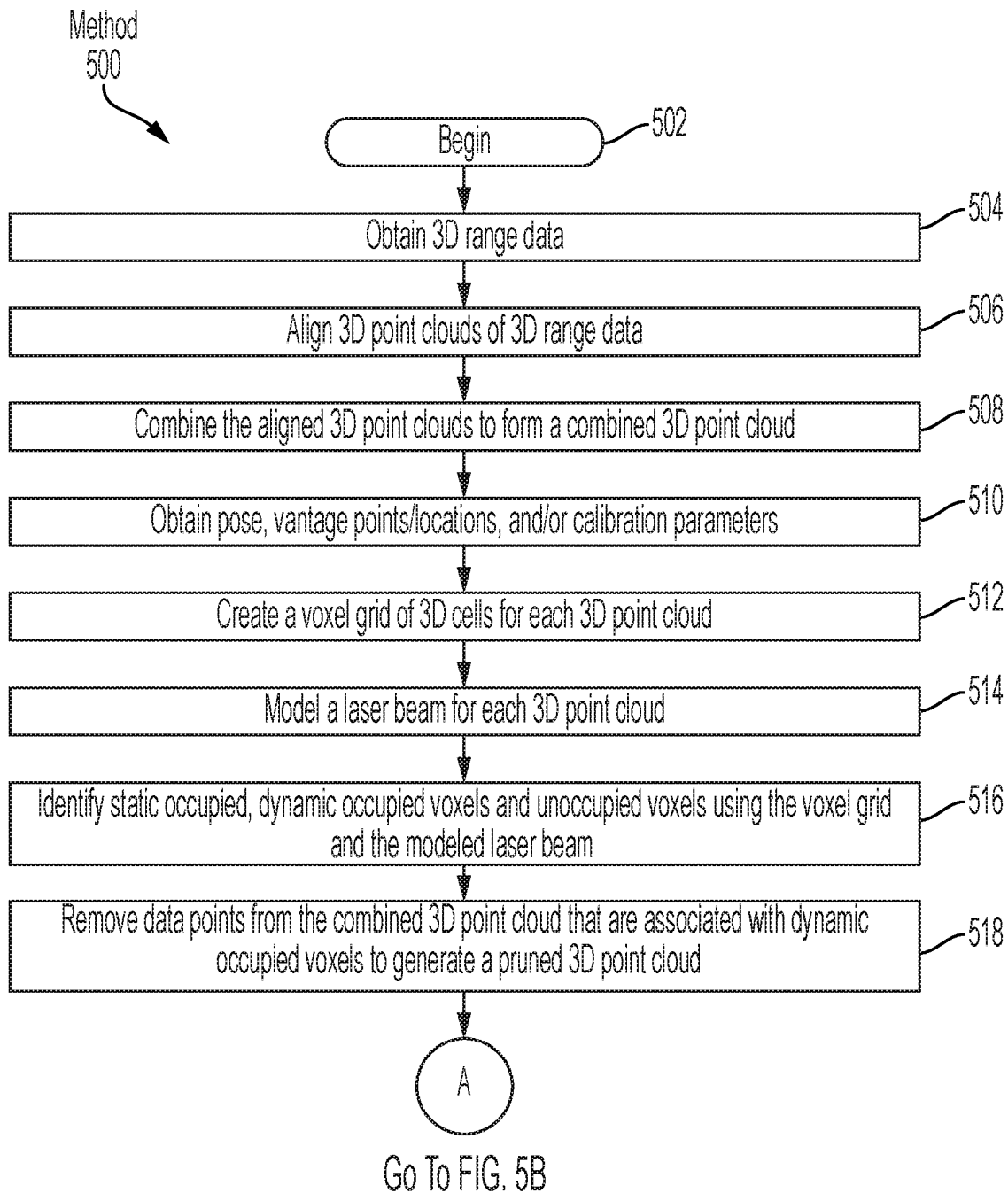
FIGS. 5A-5B (collectively referred to as "FIG. 5") provide a flow diagram of an illustrative method for map generation.

Referring now to FIG. 5, there is provided a flow diagram of an illustrative method 500 for map generation. As shown by FIG. 5A, method 500 begins with 502 and continues with 504 where 3D range data is obtained by a computing device (e.g., computing device 100 of FIG. 1, 220 of FIG. 1, and/or 400 of FIG. 4). The 3D range data is generated by a 3D laser scanner (e.g., LiDAR system 264 of FIG. 2 and/or 300 of FIG. 3) from multiple vantage points or locations. A 3D point cloud is provided for each vantage point or location. The 3D point clouds are aligned with each other by the computing device in 506. This point cloud alignment can be achieved using any known or to be known technique. For example, the 3D point clouds are aligned using Simultaneous Localization and Mapping (SLAM) which is a well-known data point alignment technique. In 508, the aligned 3D point clouds are combined by the computing device to form a combined 3D point cloud. An illustration of an illustrative combined 3D point cloud 600 is provided in FIG. 6.

In 510, the computing device obtains information specifying a known pose, known vantage points/locations of the 3D laser scanner, and known 3D laser scanner calibration parameters. The pose includes a location defined as 3D map coordinates, an angle and a pointing direction of a vehicle or other structure to which the 3D laser scanner is disposed. The information can be obtained from a datastore (e.g., datastore 112 of FIG. 1 and/or memory 412 of FIG. 4).

Next, ray-tracing operations are performed by the computing device to test whether any object of the 3D range data was at any time see-through. Stationary objects (e.g., buildings) will not be see-through at any time, but data points on moving object will be see-through at given times. Ray-tracing techniques are well known in the art. Any known or to be known ray-tracing technique can be used here. In some scenarios, the ray-tracing operations of 512-516 are performed. In 512, the computing device creates a voxel grid of 3D cells (called "voxels") for each 3D point cloud. Voxel grids are well known. A single data point of a 3D point cloud is contained in a given 3D cell. A voxel that includes a data point is called an occupied voxel, while a voxel that is absent of any data point is called an unoccupied voxel.

Figure 7:
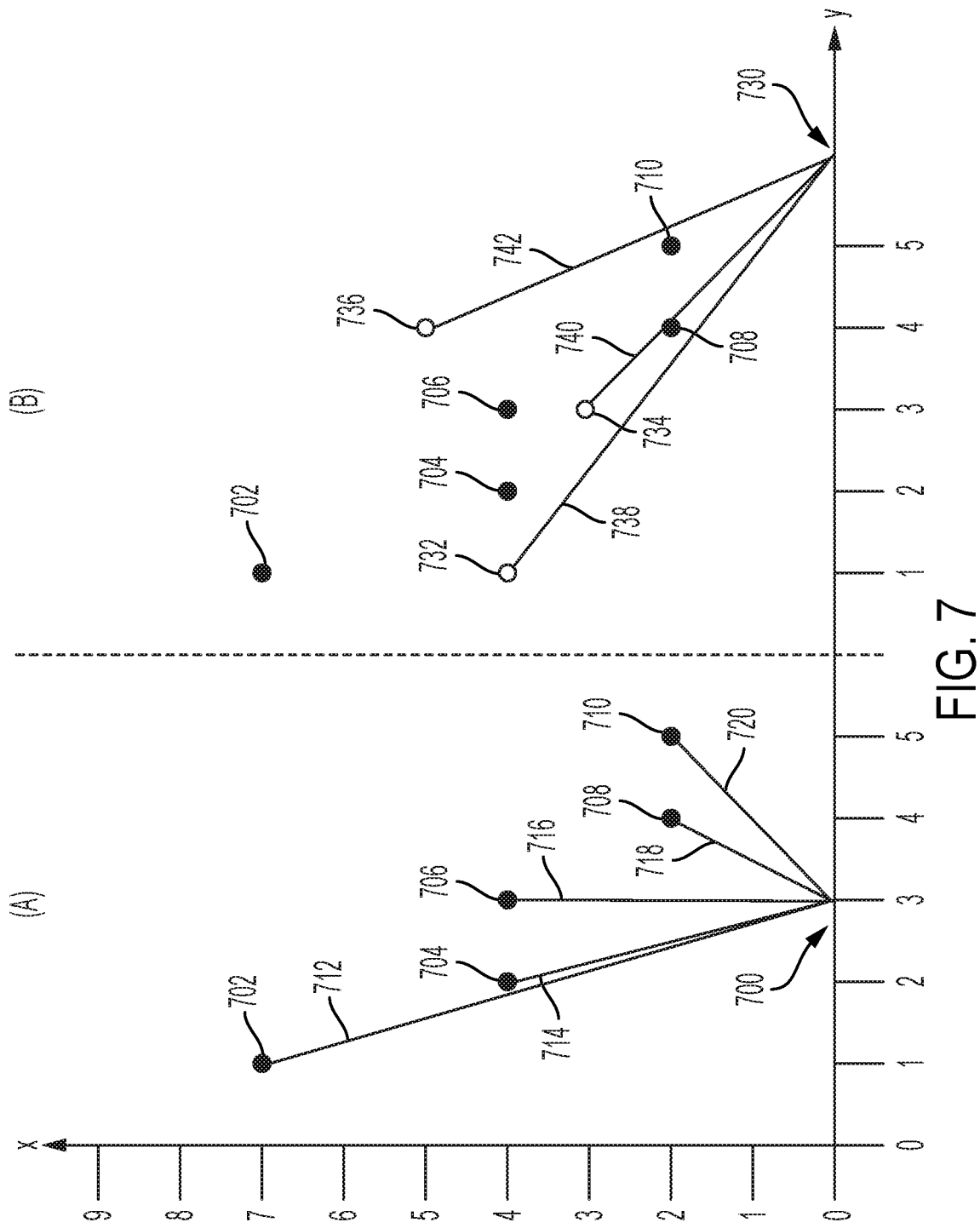
FIG. 7 provides graph(s) that are useful for understanding ray-casting.

514 involves modelling a laser beam for each 3D point cloud using the information obtained in 510 (i.e., the known pose, known vantage points/locations of the 3D laser scanner, and known 3D laser scanner calibration parameters). The laser beam is modeled for each 3D point cloud by defining a line of sight from a known location of the 3D laser scanner to each data point therein. An illustration is provided in FIG. 7 showing illustrative lines of sights 712, 714, 716, 718, 720, 738, 740, 742. Only the x-axis and y-axis is shown in FIG. 7. The z-axis is not shown in FIG. 7 for simplicity of discussion.

In portion (A) of FIG. 7, a plurality of data points 702, 704, 706, 708, 710 are shown. Arrow 700 of FIG. 7(A) points to a location on the graph representing a first vantage point/location of the 3D laser scanner when the data points 702, 704, 706, 708, 710 were generated. Line of sight 712 extends from the first vantage point/location 700 of the 3D laser scanner to data point 702. Line of sight 714 extends from the first vantage point/location 700 of the 3D laser scanner to data point 704. Line of sight 716 extends from the first vantage point/location 700 of the 3D laser scanner to data point 706. Line of sight 718 extends from the first vantage point/location 700 of the 3D laser scanner to data point 708. Line of sight 720 extends from the first vantage point/location of the 3D laser scanner to data point 710.

In portion (B) of FIG. 7, a plurality of data points 732, 734, 736 are shown. Arrow 730 of FIG. 7(B) points to a location on the graph representing a second vantage point/location of the 3D laser scanner when the data points 732, 734, 736 were generated. Line of sight 738 extends from the second vantage point/location of the 3D laser scanner to data point 702. Line of sight 714 extends from the first vantage point/location 730 of the 3D laser scanner to data point 732. Line of sight 740 extends from the first vantage point/location 730 of the 3D laser scanner to data point 734. Line of sight 742 extends from the first vantage point/location 730 of the 3D laser scanner to data point 736. The present solution is not limited to the particulars of FIG. 7.

In 516, the computing device performs operations to identify static occupied voxels, dynamic occupied voxels and unoccupied voxels using the voxel grid created in 512 and the modeled laser beam created in 514. An unoccupied voxel comprises a voxel which is absent of any data point. A static occupied voxel comprises a data point through which a line of sight of a single 3D point cloud passes. For example, in FIG. 7, static occupied voxels include voxels containing data points 702, 704, 706, 710, 732, 734, 736. These data points may be, for example, associated with building(s), tree(s), and/or sign(s). Dynamic occupied voxels comprises voxels containing data points through which lines of sight of at least two 3D point clouds pass. For example, in FIG. 7, a dynamic occupied voxel comprises a voxel containing data point 708 since line of sight 718 of portion (A) and line of sight 740 of portion (B) both intersect the same. Data point 708 may be, for example, associated with a moving vehicle (e.g., vehicle $102_2$ of FIG. 1), a pedestrian (e.g., pedestrian 116 of FIG. 1), or a cyclist (e.g., cyclist 114 of FIG. 1). Static occupied voxels and dynamic occupied voxels are identified by traversing the lines of sights 712-720, 738-742 through the voxel grid. The present solution is not limited to the particulars of these examples.

Figure 8:
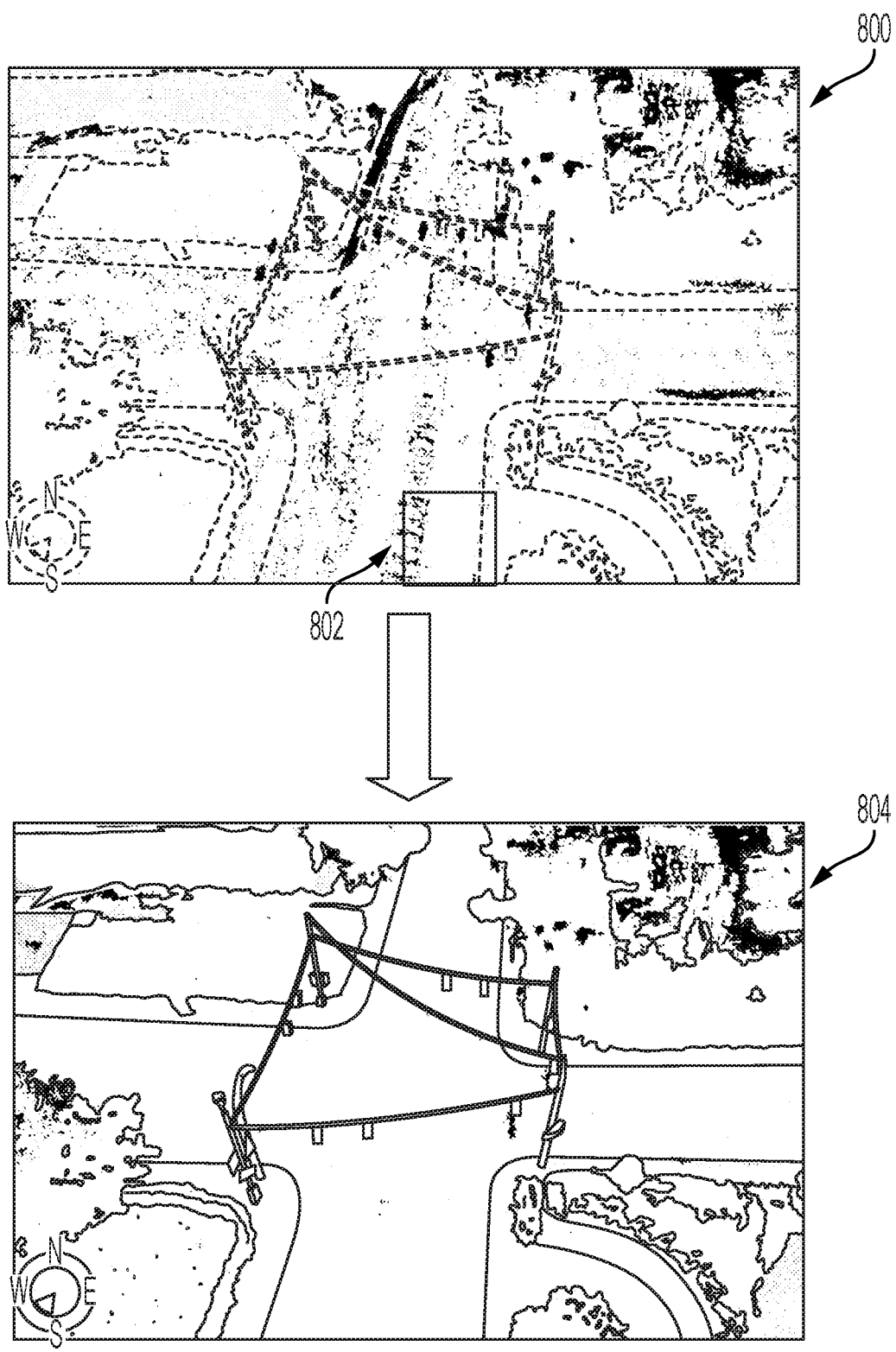
FIG. 8 provides images of point clouds.

Referring again to FIG. 5A, method 500 continues with 518 where the computing device performs operations to remove data points from the combined 3D point cloud that are associated with the dynamic occupied voxels to generate a pruned 3D point cloud. An illustrative pruned 3D point cloud 800 is shown in FIG. 8. Subsequently, method 500 continues with semantic label class operations of FIG. 5B to further remove data points from the pruned 3D point cloud that are associated with moving objects.

Figure 5B:
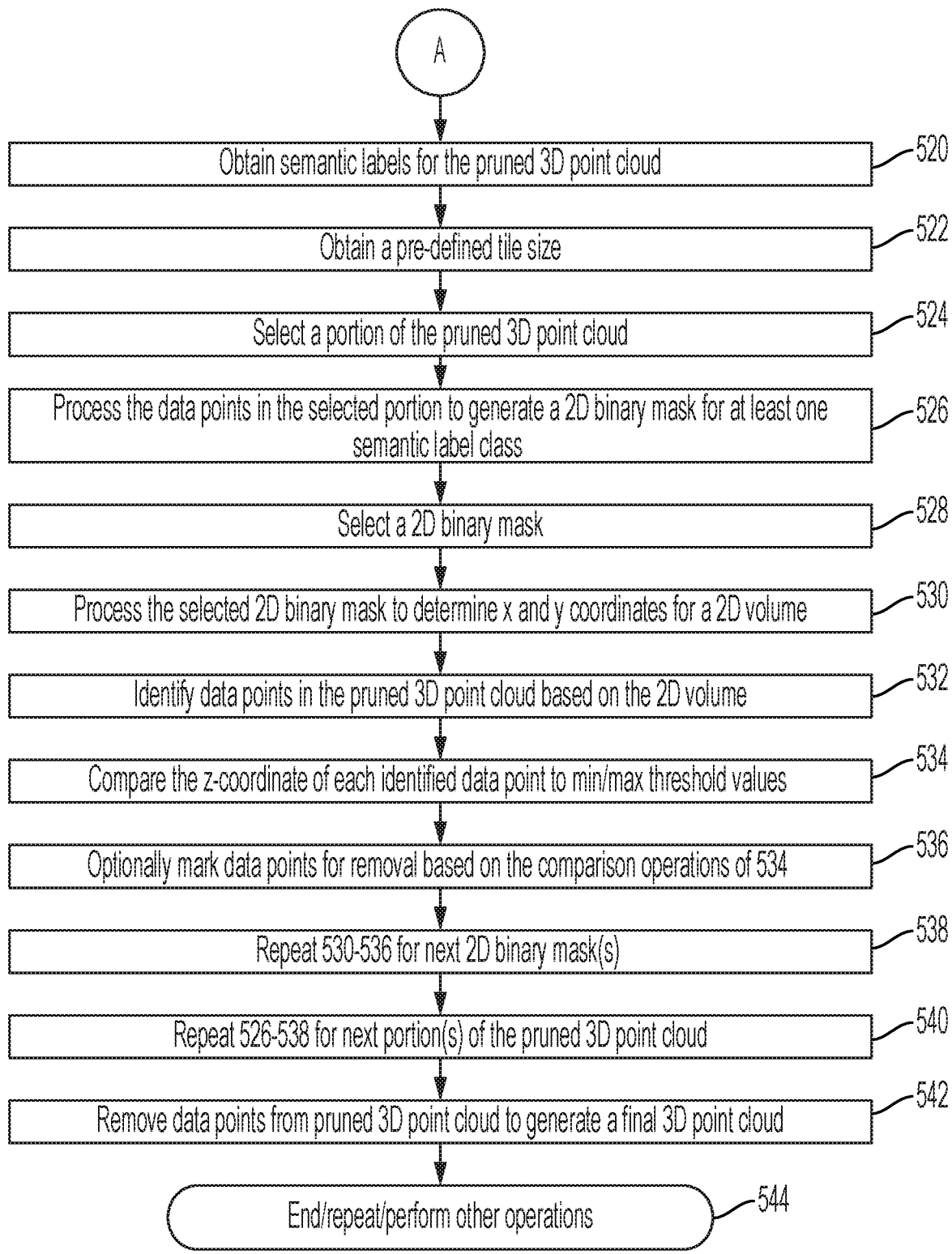
Figure 6:
FIG. 6 provides an illustration of an illustrative combined 3D point cloud.

As shown in FIG. 5B, 520 involves obtaining by the computing device semantic labels for the pruned 3D point cloud from a datastore (e.g., datastore 112 of FIG. 1 and/or memory 412 of FIG. 4). Semantic labels for data points are well known. The semantic labels can include, but are not limited to, no data, unlabeled, road, sidewalk, building, fence, vegetation, terrain, vehicle, person, animal, and/or sign. Each data point of the pruned 3D point cloud has a semantic label associated therewith. The semantic labels are then used in operations 522-540 along with the pruned 3D point cloud to test whether any remaining data points of given semantic label classes (e.g., road and/or sidewalk) reside above the given surface by certain distances.

Operations 522-526 involve: obtaining from the datastore a pre-defined tile size (e.g., 30 meter by 30 meter); selecting a portion of the pruned 3D point cloud having the pre-defined tile size (e.g., portion 802 of FIG. 8); and processing the data points in the selected portion of the pruned 3D point cloud to generate a 2D binary mask for each semantic label class of interest (e.g., road and sidewalk).

Figure 10:
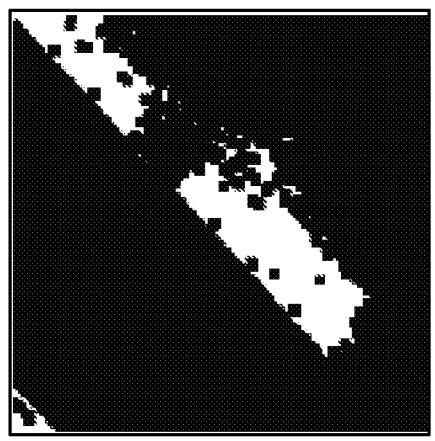
FIG. 10 shows an illustrative 2D binary mask for a sidewalk semantic label class.
Figure 9:
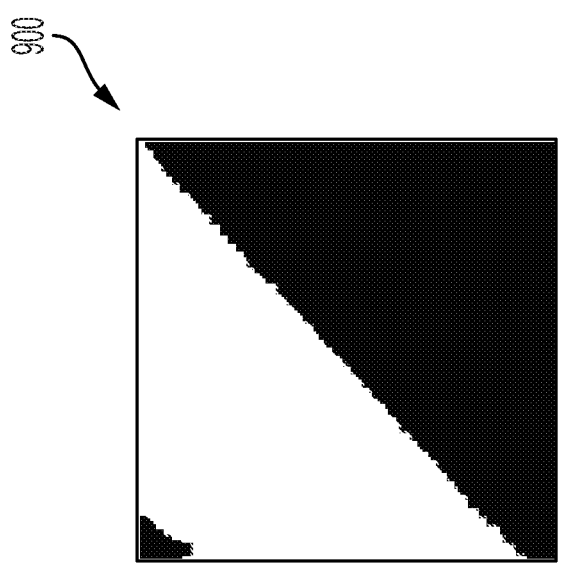
FIG. 9 shows an illustrative 2D binary mask for a road semantic label class.

In some scenarios, a 2D binary mask is created for a road semantic label class and a sidewalk semantic label class. An illustrative 2D binary mask 900 for the road semantic label class is provided in FIG. 9. The 2D binary mask 900 is created by projecting the 3D data points of the selected portion of the pruned 3D point cloud to a 2D plane. The data points associated with a road are shown in a first color (e.g., white), while all other data points are shown in a second different color (e.g., black). An illustrative 2D binary mask 1000 for the sidewalk semantic label class is provided in FIG. 10. The 2D binary mask 1000 is created by projecting the 3D data points of the selected portion of the pruned 3D point cloud to a 2D plane. The data points associated with a sidewalk are shown in a first color (e.g., white), while all other data points are shown in a second different color (e.g., black). The present solution is not limited to the particulars of FIGS. 9-10.

Referring again to FIG. 5B, method 500 continues with 528 where the computing device selects one of the 2D binary masks for subsequent processing. The computing device then processes the selected 2D binary mask in 530 to determine x-coordinates and y-coordinates for a 2D volume that defines the object of the given semantic label class (e.g., a road or a sidewalk). Next in 532, the computing device identifies data points in the pruned 3D point cloud that (i) are of the same semantic label class (e.g., road or sidewalk) as the object defined by the 2D volume and (ii) have x-coordinates/y-coordinates contained in the 2D volume.

The z-coordinate of each identified data point is compared in 534 to a minimum threshold value and to a maximum threshold value. The threshold values are pre-defined for the respective semantic label class (e.g., road or sidewalk) of a plurality of semantic label classes. The semantic label classes can have the same or different threshold value(s) associated therewith. Data points are optionally marked for removal in 536 based on results of the comparison operations. For example, data points are marked for removal which have z-coordinates that are greater than the minimum threshold value (0.3 meters) and less than the maximum threshold value (4.5 meters for road surfaces and 2.5 meters for sidewalk surfaces).

Operations of 530-536 are repeated for next 2D binary mask(s), as shown by 538. Also, operations 526-538 are repeated for next portions(s) of the pruned 3D point cloud, as shown by 540. In 542, data points are removed from the pruned 3D point cloud to generate a final 3D point cloud. An illustration of a final 3D point cloud 804 is shown in FIG. 8. The 3D point cloud 804 is absent of or has a reduced number of data points associated with moving objects. Notably, data points for stationary structures (e.g., trees and fixtures) residing above the roads and/or sidewalks have been preserved in the final 3D point cloud 804. The final 3D point cloud defines a high definition map. Subsequently, 544 is performed where method 500 ends or other processing is performed (e.g., return to 502 of FIG. 5A).

Figure 11:
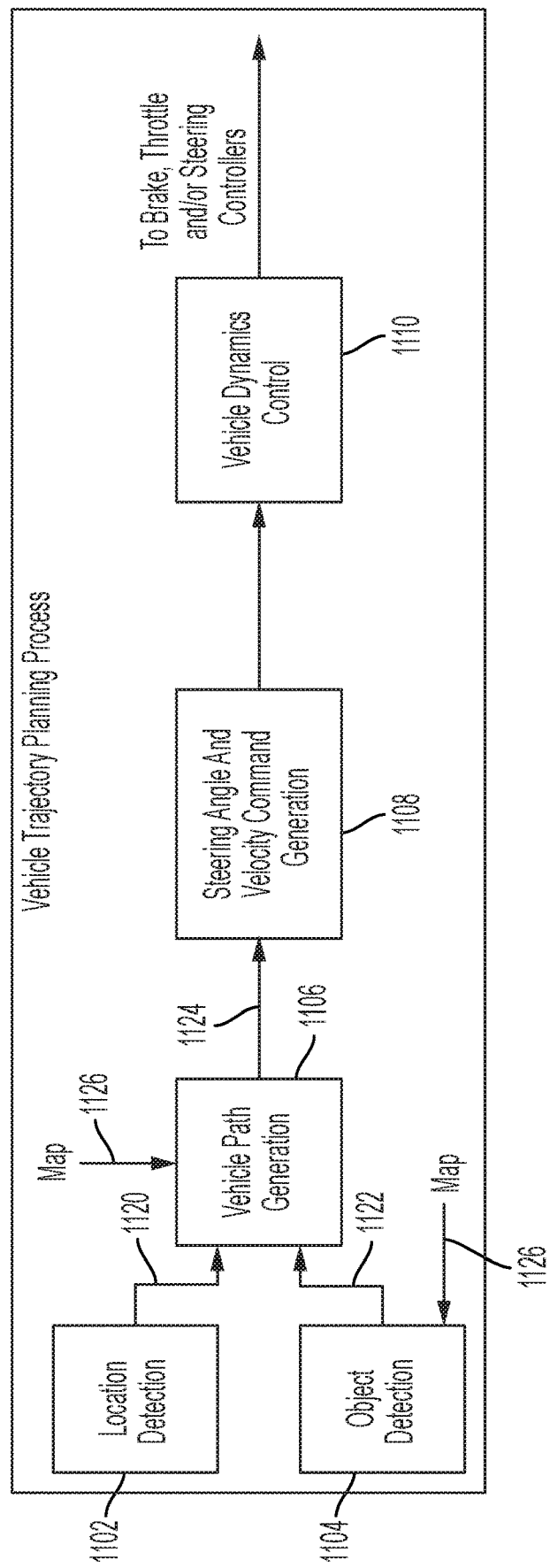
FIG. 11 provides a block diagram that is useful for understanding how vehicle control is achieved in accordance with the present solution.

As noted above, the high definition map can be used by an AV for object trajectory prediction, vehicle trajectory generation, and/or collision avoidance. A block diagram is provided in FIG. 11 that is useful for understanding how vehicle control is achieved in accordance with the present solution. All or some of the operations performed in FIG. 11 can be performed by the on-board computing device of a vehicle (e.g., AV 102$_1$ of FIG. 1) and/or a remote computing device (e.g., computing device 110 of FIG. 1).

In block 1102, a location of the vehicle is detected. This detection can be made based on sensor data output from a location sensor (e.g., location sensor 260 of FIG. 2) of the vehicle. This sensor data can include, but is not limited to, GPS data. Information 1120 specifying the detected location of the vehicle is then passed to block 1106.

In block 1104, an object is detected within proximity of the vehicle. This detection is made based on sensor data output from a camera (e.g., camera 262 of FIG. 2) of the vehicle. Any known or to be known object detection technique can be used here. Information about the detected object 1122 is passed to block 1106. This information includes, but is not limited to a position of an object, an orientation of the object, a spatial extent of the object, an initial predicted trajectory of the object, a speed of the object, and/or a classification of the object. The initial predicted object trajectory can include, but is not limited to, a linear path pointing in the heading direction of the object. The initial predicted trajectory of the object can be generated using a high definition map 1126 (or final 3D point cloud) which was generated in accordance with the above-described method 500.

In block 1106, a vehicle trajectory is generated using the information from blocks 1102 and 1104, as well as the high definition map 1126. Techniques for determining a vehicle trajectory are well known in the art. Any known or to be known technique for determining a vehicle trajectory can be used herein. For example, in some scenarios, such a technique involves determining a trajectory for the AV that would pass the object when the object is in front of the AV, the object has a heading direction that is aligned with the direction in which the AV is moving, and the object has a length that is greater than a threshold value. The present solution is not limited to the particulars of this scenario. The vehicle trajectory 1124 can be determined based on the location information 1120, the object detection information 1122, and/or a high definition map 1126 which is stored in a datastore of the vehicle. The vehicle trajectory 1124 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 1124 is then provided to block 1108.

In block 1108, a steering angle and velocity command is generated based on the vehicle trajectory 1124. The steering angle and velocity command is provided to block 1110 for vehicle dynamics control. Vehicle dynamics control is well known. The vehicle dynamics control cause the vehicle to follow the vehicle trajectory 1124.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for generating a map, comprising:
   obtaining, by a computing device, a 3D point cloud combining a plurality of 3D point clouds that comprise sensor data generated by sensors and aligned using localization and mapping operations;
   creating, by the computing device, a grid of voxels for the 3D point cloud, where each of said voxel comprises a single point of the 3D point cloud;
   identifying, by the computing device, static occupied voxels and dynamic occupied voxels based on results of ray-casting operations, wherein each one of said static occupied voxels comprises a first data point of the 3D point cloud that has a single line of sight passing therethrough and each one of the dynamic occupied voxels comprises a second data point of the 3D point cloud that has at least two lines of sight passing therethrough, where a first one of the lines of sight extends from a first vantage point or location of a 3D laser scanner and a second one of the lines of sight extends from a different second vantage point or location of the 3D laser scanner;
   generating, by the computing device, a pruned 3D point cloud by removing the second data points from the 3D point cloud that are associated with the dynamic occupied voxels;
   generating, by the computing device, a 2D binary mask for at least one semantic label class of the pruned 3D point cloud;
   processing, by the computing device, the 2D binary mask to obtain x-coordinates and y-coordinates for a 2D volume defining an object of the at least one semantic label class;
   identifying, by the computing device, second data points in the pruned 3D point cloud based on the 2D volume;
   comparing, by the computing device, z-coordinates of the second data points to at least one threshold value selected for the at least one semantic label class; and
   generating, by the computing device, the map by removing one or more of the second data points from the pruned 3D point cloud based on results of the comparing.

2. The method according to claim 1, wherein the at least one semantic label class of the pruned 3D point cloud comprises road or sidewalk.

3. The method according to claim 1, wherein the 2D binary mask is generated by projecting data points of the pruned 3D point cloud to a 2D plane.

4. The method according to claim 3, wherein data points associated with the at least one semantic label class are provided in a first format within the 2D binary mask, and data points associated with other semantic label classes are provided in a second format within the 2D binary mask.

5. The method according to claim 4, wherein the first format comprises a first color and the second format comprises a second different color.

6. The method according to claim 1, wherein the second data points comprise data points in the pruned 3D point cloud that (i) are associated with the at least one semantic label class and (ii) have x-coordinates and y-coordinates that are contained in the 2D volume.

7. The method according to claim 1, wherein the z-coordinates of the second data points are compared to a minimum threshold value for the at least one semantic label class and compared to a maximum threshold value for the at least one semantic label class.

8. The method according to claim 7, wherein the one or more second data points which are removed from the pruned 3D point cloud have z-coordinates falling within a range defined by the minimum threshold value and the maximum threshold value.

9. The method according to claim 1, wherein at least two semantic label classes have a different threshold value associated therewith.

10. The method according to claim 1, further comprising using the map to control operations of a vehicle.

11. A system, comprising:
    a processor;
    a non-transitory computer-readable storage medium comprising programming instructions that are configured to cause the processor to implement a method for generating a map, wherein the programming instructions comprise instructions to:
      obtain a 3D point cloud combining a plurality of 3D point clouds that comprise sensor data generated by sensors and aligned using localization and mapping operations;
      create a grid of voxels for the 3D point cloud, where each of said voxel comprises a single point of the 3D point cloud;
      perform ray-casting operations to identify static occupied voxels and dynamical occupied voxels, wherein each one of said static occupied voxels comprises a first data point of the 3D point cloud that has a single line passing therethrough and each one of the dynamic occupies voxels comprises a second data point of the 3D point cloud that has at least two lines of sight passing therethrough, where a first one of the lines of sight extends from a first vantage point or location of a 3D laser scanner and a second one of the lines of sight extends from a different second vantage point or location of the 3D laser scanner;
      generate a pruned 3D point cloud by removing the second data points from the 3D point cloud that are associated with the dynamic occupied voxels;
      generate a 2D binary mask for at least one semantic label class of the pruned 3D point cloud;
      process the 2D binary mask to obtain x-coordinates and y-coordinates for a 2D volume defining an object of the at least one semantic label class;
      identify second data points in the pruned 3D point cloud based on the 2D volume;
      compare z-coordinates of the second data points to at least one threshold value selected for the at least one semantic label class; and
      generate the map by removing one or more of the second data points from the pruned 3D point cloud based on results of the comparing.

12. The system according to claim 11, wherein the at least one semantic label class of the pruned 3D point cloud comprises road or sidewalk.

13. The system according to claim 11, wherein the 2D binary mask is generated by projecting data points of the pruned 3D point cloud to a 2D plane.

14. The system according to claim 13, wherein data points associated with the at least one semantic label class are provided in a first format within the 2D binary mask, and data points associated with other semantic label classes are provided in a second format within the 2D binary mask.

15. The system according to claim 14, wherein the first format comprises a first color and the second format comprises a second different color.

16. The system according to claim 11, wherein the second data points comprise data points in the pruned 3D point cloud that (i) are associated with the at least one semantic label class and (ii) have x-coordinates and y-coordinates that are contained in the 2D volume.

17. The system according to claim 11, wherein the z-coordinates of the second data points are compared to a minimum threshold value for the at least one semantic label class and compared to a maximum threshold value for the at least one semantic label class.

18. The system according to claim 17, wherein the one or more second data points which are removed from the pruned 3D point cloud have z-coordinates falling within a range defined by the minimum threshold value and the maximum threshold value.

19. The system according to claim 11, wherein at least two semantic label classes have a different threshold value associated therewith.

20. The system according to claim 11, wherein the programming instructions further comprise instructions to cause operations of a vehicle to be controlled based on the map.

21. A non-transitory computer-readable medium that stores instructions that is configured, when executed by at least one computing device, to cause the at least one computing device to perform operations comprising:

obtaining a 3D point cloud combining a plurality of 3D point clouds that comprise sensor data generated by sensory and aligned using localization and mapping operations;

creating a grid of voxels for the 3D point cloud, where each of said voxel comprises a single point of the 3D point cloud;

performing ray-casting operations to identify static occupied voxels and dynamic occupied voxels, wherein each one of the static occupied voxels comprises a first data point of the 3D point cloud that has a single line of sight passing therethrough and each one of the dynamic occupied voxels comprises a second data point of the 3D point cloud that has at least two lines of sight passing therethrough, where a first one of the lines of sight extends from a first vantage point or location of a 3D laser scanner and a second one of the lines of sight extends from a different second vantage point or location of the 3D laser scanner;

generating a pruned 3D point cloud by removing the second data points from the 3D point cloud that are associated with the dynamic occupied voxels;

generating a 2D binary mask for at least one semantic label class of the pruned 3D point cloud;

processing the 2D binary mask to obtain x-coordinates and y-coordinates for a 2D volume defining an object of the at least one semantic label class;

identifying second data points in the pruned 3D point cloud based on the 2D volume;

comparing z-coordinates of the second data points to at least one threshold value selected for the at least one semantic label class; and generating the map by removing one or more of the second data points from the pruned 3D point cloud based on results of the comparing.

* * * * *